United States Patent [19]

Johansson

[11] Patent Number: 4,636,105
[45] Date of Patent: Jan. 13, 1987

[54] CORNER PIECE FOR FRAMES

[76] Inventor: Gert A. Johansson, von Holtens väg 21, S - 443 00 Lerum, Sweden

[21] Appl. No.: 694,391
[22] PCT Filed: Mar. 9, 1984
[86] PCT No.: PCT/SE84/00087
    § 371 Date: Jan. 4, 1985
    § 102(e) Date: Jan. 4, 1985
[87] PCT Pub. No.: WO84/04366
    PCT Pub. Date: Nov. 8, 1984

[30] Foreign Application Priority Data

May 5, 1983 [SE] Sweden ................................ 8302583

[51] Int. Cl.$^4$ .............................................. F16B 7/00
[52] U.S. Cl. ...................... 403/205; 403/292; 403/295; 403/298; 403/403; 312/140; 285/424
[58] Field of Search ............... 403/295, 292, 297, 298, 403/401, 402, 403, 205, 270, 272, 276; 312/140; 285/907, 419, 397, 185, 424

[56] References Cited

U.S. PATENT DOCUMENTS

| 113,869 | 4/1871 | Gaylord | 403/292 X |
| 2,066,227 | 12/1936 | Pieukauf et al. | 403/205 X |
| 2,281,220 | 4/1942 | Anderson | 403/205 |
| 3,218,097 | 11/1965 | Bower et al. | 403/292 X |
| 3,923,326 | 12/1975 | Mez | 285/424 X |
| 3,977,800 | 8/1976 | Cassel | 403/297 X |
| 4,099,815 | 7/1978 | Cox et al. | 403/295 X |
| 4,108,520 | 8/1978 | Litchfield | 312/140 X |
| 4,123,094 | 10/1978 | Smitka | 285/424 X |
| 4,205,486 | 6/1980 | Guarnacci | 403/403 X |
| 4,236,846 | 12/1980 | Barton | 403/298 |
| 4,303,289 | 12/1981 | Hardy | 403/295 X |
| 4,344,718 | 8/1982 | Taylor | 402/292 X |
| 4,509,778 | 4/1985 | Arnoldt | 285/424 X |

FOREIGN PATENT DOCUMENTS

| 0082509 | 3/1957 | Denmark | 403/295 |
| 2612141 | 10/1977 | Fed. Rep. of Germany | 403/295 |
| 1242195 | 8/1960 | France | 403/295 |
| 1314894 | 4/1973 | United Kingdom | 403/270 |

Primary Examiner—Cornelius J. Husar
Assistant Examiner—Todd G. Williams
Attorney, Agent, or Firm—Fleit, Jacobson, Cohn & Price

[57] ABSTRACT

Corner pieces for frames are used for joining together frame sides situated adjacent the corner piece. The frame sides are tubular or profile-shaped and adapted in their inner cavity to receive legs which are angularly arranged on the corner piece and interconnected by means of an intermediate part. Each leg consists of two parallel shanks and each shank is shaped so as to be complementary to the cavity of the frame side profile engaging the respective shank so that the shank can be inserted guidingly and with a certain friction in the cavity of the profile. The corner piece is composed of two identical corner parts interconnected by fastening means, the legs and the intermediate part of the corner piece having, on one hand, a first symmetry plane coinciding with the frame plane and, on the other hand, a second symmetry plane or bisector plane bisecting the angle between the legs of the corner piece. The second plane is perpendicular to the first symmetry plane.

6 Claims, 6 Drawing Figures

CORNER PIECE FOR FRAMES

FIELD OF THE INVENTION

The present invention relates to a corner piece for frames intended for displaying or advertising purposes, for instance of the type where a sheet of cardboard or other rigid material can be inserted from one side of the frame. Such frames are generally used in shops and other places of sale to give information about goods, prices, news, etc. The frames may either be placed on a counter with the aid of a foot or be hung up in wires. It is also possible to interconnect several frames by means of oblong intermediate pieces which also permit angular interconnection of the frames.

DESCRIPTION OF RELATED ART

It is previously known to manufacture frames of this type by means of extruded profiles which are available in meter-length and cut to the desired length in order to constitute the sides of the frames. The profiles are interconnected by means of corner pieces so as to form a complete frame.

Frames for advertising and information purposes often are used only once, e.g. in fairs, exhibitions and the like. It is therefore imperative that the frames be cheap. In this respect extruded profiles constitute an inexpensive element manufactured by means of simple tools while, on the other hand, the frame corners are more expensive because, for one thing, tools with mobile parts are required and also because the detail proper will become more homogeneous and requires more material.

SUMMARY OF THE INVENTION

This invention permits making a cheap frame because the corner pieces consist of two corner parts and the tool required for the corner parts can be made up very simply in the form of two stationary tool halves and the corner parts may be formed of a small amount of material. Moreover, it is easy to assemble and disassemble the frames and they may be used repeatedly in various places without requiring much work.

According to the invention a corner piece for frames is provided for joining together frame sides situated adjacent the corner piece, which sides are tubular or profile-shaped and adapted in their inner cavity to accommodate legs which are angularly disposed on the corner piece and interconnected by means of an intermediate part of the corner piece in that each leg consists of two parallel shanks and that each shank is shaped so as to be complementary to the cavity of the frame side profile engaging the respective shank so that the shank can be inserted guidingly and with a certain friction in the cavity of the frame side.

In a preferred embodiment of the invention the corner piece is composed of two identical corner parts interconnected by fastening means in such a way that the legs and intermediate part of the corner piece will have a first symmetry plane coinciding with the plane of the frame and also a second symmetry plane or bisector plane through the bisector to the angle between the corner piece legs, said second plane being perpendicular to the first symmetry plane.

In one embodiment of the invention the corner piece has two legs, the angle between the legs being right, i.e. 90°.

In another embodiment the corner piece has three legs disposed in T-fashion, two of which are aligned with one another while the third leg lies in the bisector plane and makes an angle of 90° to each of said first-mentioned legs.

In an important embodiment the fastening means of the corner part comprises a cylindrical connection piece which is disposed at right angles to the first symmetry plane and situated in the bisector plane and the axial end of which consists of a supporting edge lying in the first symmetry plane and on one side of the bisector plane, a guide pin projecting above the first symmetry plane and at right angles thereto, while the connection piece has, under the first symmetry plane and on the other side of the bisector plane, a downwardly directed recess shaped so as to be complementary to the upwardly projecting guide pin so that the guide pin of one of the interfacing connection pieces will engage the recess of the other connection piece and vice versa when two interfacing corner parts are joined to form a corner piece.

In one embodiment the fastening means has boundary surfaces lying in the first symmetry plane and bearing against each other when two corner parts have been joined into a corner piece.

In still another embodiment the interengaging corner part guide pins are glued together.

In a further embodiment the shanks of the legs have inside their outer portions a narrower portion so that a gap or space is obtained in this portion between the shanks and the profile enclosing the shanks.

In another embodiment the guide pin has side faces lying in the bisector plane.

BRIEF DESCRIPTION OF THE DRAWINGS

The invention will be described more fully below with reference to the accompanying drawings, in which.

DESCRIPTION OF THE PREFERRED EMBODIMENTS

Figure 1:
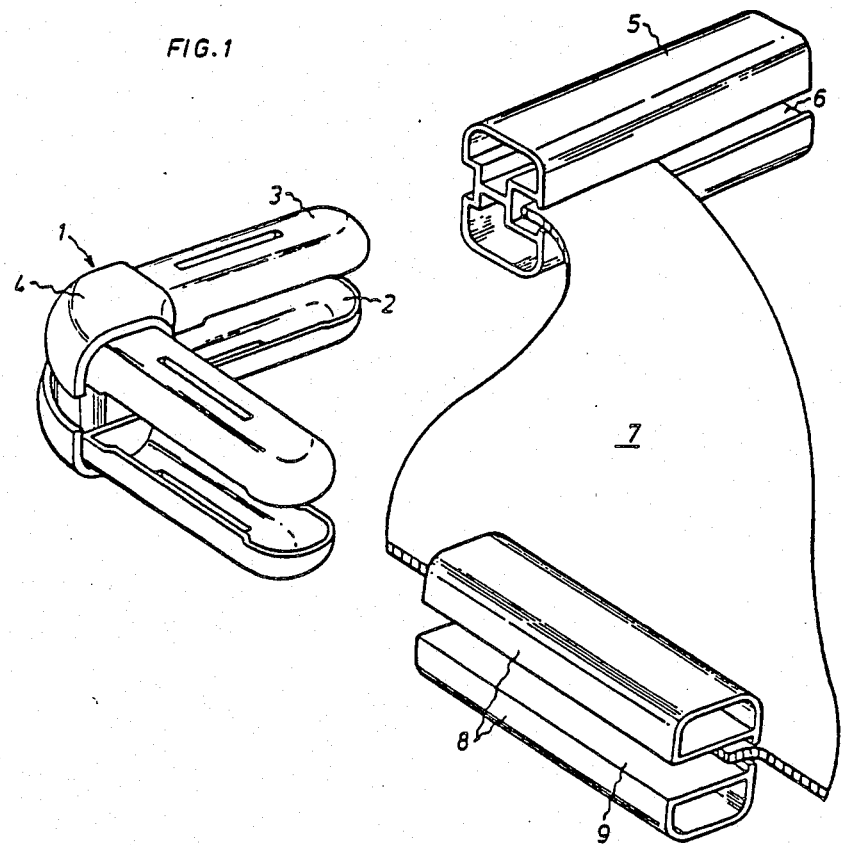
FIG. 1 is a perspective view showing the parts included in a corner prior to mounting of the corner.

In FIG. 1 the complete corner piece is designated by 1 and this is composed of two corner parts 2 bottom and 3 top Each corner part has one intermediate part 4. Guide pins are formed on the intermediate part 4 as a means of joining the corner parts 2 and 3 together to form a complete corner piece as will be described in more detail below.

An extruded hollow profile 5 can be passed over the corresponding shanks of the corner parts 2 and 3. The dimensions are chosen so that shanks and profile engage each other with a certain deformation or resilience so that they cannot slide apart. A groove 6 is made in the profile 5 in order to receive the edge of a sheet 7 provided with information.

The two other shanks of the corner piece, which are directed down to the right in the figure, are adapted to receive two identical profiles 8 which face each other so that a slot 9 will be formed between the profiles. The sheet 7 can be passed through the slot 9 into the frame as finally mounted. The sheet 7 can be taken out of the frame and be exchanged for another sheet with other information, when so desired.

Figure 2:
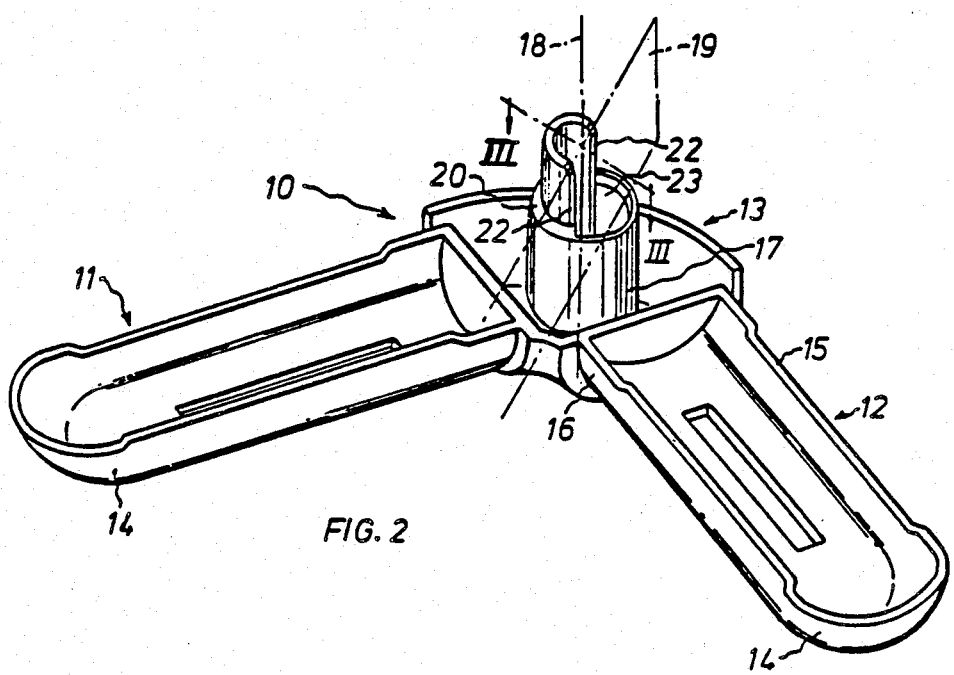
FIG. 2 is a perspective view showing a corner part with two shanks.

FIG. 2 is a perspective view of a corner part 10. The shanks of the corner part are designated by 11 and 12, and 13 is the intermediate part joining the two shanks. The shanks 11 and 12 are equal in length and make an angle of 90° to each other. The shanks are provided with thin walls and have rounded end parts 14 and a recessed section 15 between these end parts and the inner part 16. In this way the profile passed over the shank will bear resiliently against the end part 14 and the inner part 16 so as to provide a certain engagement which gives a satisfactory friction between said parts and satisfactory guidance is also obtained between shanks and profile since they are provided with thin resilient walls.

The intermediate part 13 includes a tubular cylindrical connection piece 17. In the case shown the connection piece is circular-cylindrical with an axis 18 being perpendicular to the plane in which the shanks are situated as well as to the plane of the entire frame. Vertical planes through the shanks 11 and 12 intersect along the axis 18. In the case shown these planes make an angle of 90°. A bisector plane 19 through the axis 18 divides up the angle between the planes through the shanks into two equal parts, i.e. in this case it makes an angle of 45° to these two planes.

The tubular connection piece 17 has a supporting edge 20 which is perpendicular to the axis 18 and the surface of which lies in the central plane, i.e. in the first symmetry plane, of the finished frame. A guide pin 21 projects upwards above the supporting edge 20 and is semi-cylindrical. The side faces 22 of the cylinder, which are parallel with the axis 18, lie in the bisector plane 19. The side faces 22 extend all the way down to the bottom 26 of the connection piece 17. Provided between the side faces 22 and the inner wall of the tubular connection piece 17 is a recess 23 the inner contour of which is cylindrical and symmetrical with the outer contour of the guide pin 21 with respect to the bisector plane 19. This involves that it is possible to join two corner parts 10 by turning one corner part (10' below) upside down so that the vertical plane of the shanks 11, 12 coincide with the vertical plane of the shanks 12' and 11', respectively, and the guide pin 21' can be passed inwards on the upper part down within the recess 23 of the lower part as will be described in more detail below.

Figure 3:
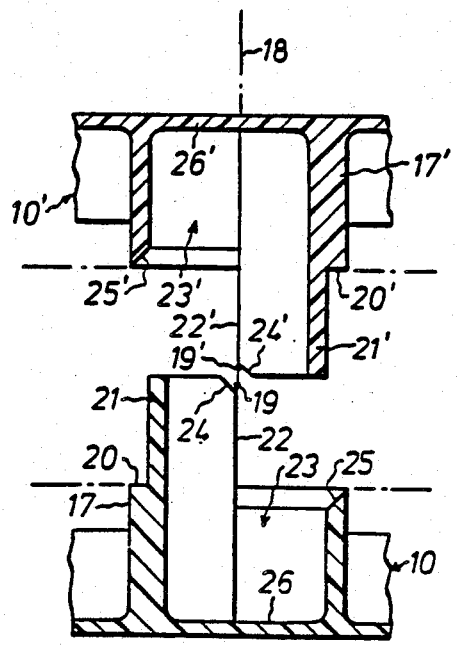
FIG. 3 is a cross-section, taken on line III—III in FIG. 2, through the interfacing guide pins of two corner parts, before the pins have been brought together.

FIG. 3 shows a section through the tubular connection piece 17 and the guide pin 21 in a lower corner part 10 along the plane designated by III—III in FIG. 2 and passing through the axis 18 at right angles to the bisector plane 19. A corner part is designated by 10' and is turned upside down and placed over the corner part 10 so that the axes 18, the vertical planes of the shanks 11, 12' and 12, 11' respectively and the bisector planes 19 and 19' respectively coincide.

Thus, in FIG. 3 the bisector planes 19, 19' extend at right angles to the plane of the paper through the axis 18. In accordance with the above description the side faces 22 of the corner part 10 and the side faces 22' of the corner part 10' will thus both lie in the common bisector plane 19, 19' but at an axial distance from each other. The supporting edges 20 and 20' and bevels 25, 25' on the respective connection pieces 17 and 17' also appear from the figure. Also the upper part of the guide pins 21, 21' has bevels 24, 24' at the uppermost corners of the side faces 22, 22'. The bevels 25, 25', 24, 24' facilitate the entering of the guide pins 21, 21' into the respective recesses 23' and 23. In the figure 23, 23' designate the recesses in the corner parts 10 and 10' respectively, while 26, 26' designate the bottom portions.

Figure 4:
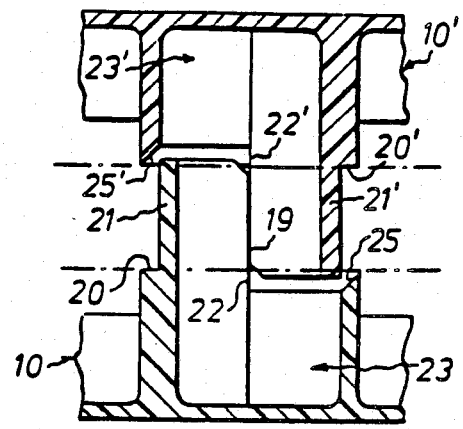
FIG. 4 shows the same pins in entering position.

FIG. 4 shows how the side faces 22 and 22' have come in contact with each other when the corner parts 10, 10' have been moved towards each other along the common bisector plane 19, 19'. During continued telescoping movement along the bisector plane the guide pin 21' will enter and pass into the recess 23, which is facilitated by the bevel 25 and to the left of the bisector plane the guide pin 21 is passed in the same way into the recess 23', where the bevel 25' facilitates the telescoping movement.

Figure 5:
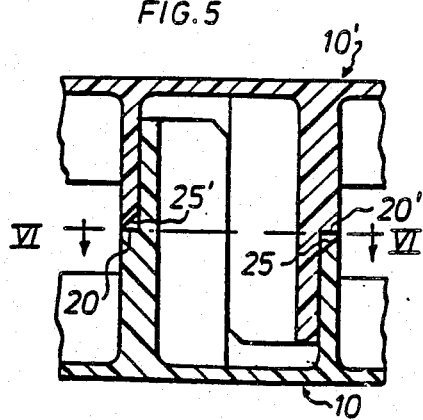
FIG. 5 shows the pins completely joined in engagement with each other.

In FIG. 5 the corner parts 10, 10' have been brought together as far as possible in that the supporting edges 20' and 20 have been moved into contact with the upper edges 25 and 25', respectively, of the tubular connection pieces 17 and 17' respectively. As the two corner parts 10, 10' are identical the supporting edges 20, 20' will thus lie in the centre plane of the corner piece as well as of the entire frame. It should also be pointed out that the corner part 10, 10' cannot turn relative to each other about the axis 18 since this is prevented by the engagement between the side faces 22, 22' of the guide pins 21, 21'. One has thus obtained a firm and dimension-stable corner piece which can be used as has been described in conjunction with FIG. 1. To further increase the shape-permanance of the corner piece glue or some other bonding agent may be applied to the surfaces 20, 22, 20', 22', 25, 25' etc, of the guide pins which lie in contact with each other in the finally mounted position.

Figure 6:
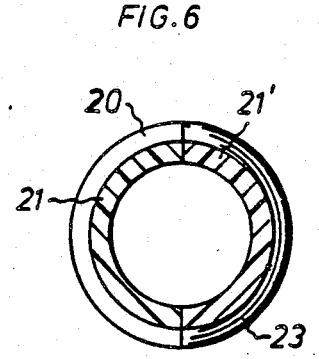
FIG. 6 is a cross-section on the first symmetry plane VI—VI in FIG. 5.

FIG. 6 shows a section along the frame centre plane VI—VI in FIG. 5 from which it appears how the configuration of the outer contour of the cut guide pin 21' is complementary to the inner contour of the recess 23. Otherwise the same reference numerals as before are used in this figure.

It is obvious that anyone skilled in the art can modify the embodiment in various ways within the scope of the invention, such as this is specified in the appended claims. Thus, for example, the tubular connection pieces 17 can be given another shape than the circular shape, the shanks can be formed so as not to be symmetrical around its vertical plane, the outer mantle on the intermediate parts 4 can be drawn down to the symmetry plane of the frame so as to bear against each other, the guide pin 21 and the recess 23 can be replaced by several pins and recesses, etc.

I claim:

1. A corner connection device for joining adjacent tubular frame sides having inner cavities, said corner connection device comprising:
   two identical corners parts interconnected to form a corner piece, each of said corner parts comprising
      two shank parts perpendicular to each other each including sides sized and shaped to be engaged and received within said inner cavities,
      an intermediate part positioned between said perpendicularly positioned shank parts,
      a fastening portion extending out of said intermediate part and having first and second planes, said first plane coinciding with and symmetrical about the tubular frame sides, said second plane bisecting the angle between said perpendicular shanks, and being perpendicular to said first plane, said fastening portion further comprising a cylindrical lug extending at right angles to said first plane and situated in said bisector plane, a supporting edge located on the axial free end of said cylindrical lug, said support edge lying in said first plane, a guide pin projecting above said support edge on one side of said bisector plane and projecting above said first plane at right angles thereto, and a downwardly directed recess below said first plane and on the opposite side of the bisector plane to the guide pin, said recess being shaped complementary to said upwardly projecting guide pin, said fastening portion interconnecting said two corner parts by said guide pin on a first corner part engaging the recess of said fastening portion of an oppositely facing second corner part.

2. Corner connection means according to claim 1, wherein said shanks are shaped to be inserted guidingly with a certain amount of friction against said inner walls of the corresponding cavity of said tubular frame sides.

3. Corner connection means according to claim 1, wherein said fastening portions have boundary surfaces lying in said first symmetry plane and adapted to bear against each other when two corner parts have been interconnected.

4. Corner connection means according to claim 1, wherein said interengaging fastening portions of said corner parts are glued together.

5. Corner connecting means according to claim 1, wherein said shanks have at their intermediate portion a narrower section such that a space is obtained in this section between said shanks and said frame cavity enclosing said shanks.

6. Corner connection means according to claim 2, wherein said guide pin has side faces lying in said bisector plane.

* * * * *